United States Patent [19]

Hertrich et al.

[11] Patent Number: 4,854,922

[45] Date of Patent: Aug. 8, 1989

[54] BELT TENSIONING DEVICE

[75] Inventors: Steffen Hertrich, Herzogenaurach; Dieter Goppelt, Aurachtal, both of Fed. Rep. of Germany

[73] Assignee: INA Walzlager Schaeffler KG, Fed. Rep. of Germany

[21] Appl. No.: 316,458

[22] Filed: Feb. 27, 1989

[30] Foreign Application Priority Data

Mar. 19, 1988 [DE] Fed. Rep. of Germany ... 63-3809362

[51] Int. Cl.$^4$ .............................................. F16H 7/10
[52] U.S. Cl. .................................................... 474/110
[58] Field of Search ................ 474/101, 103, 109–111, 474/113, 115, 117, 133, 135, 136, 138

[56] References Cited

U.S. PATENT DOCUMENTS 4,539,001 9/1985 Okabe ............................. 474/110 X
4,798,563 1/1989 Okabe et al. ........................ 474/110

Primary Examiner—Thuy M. Bui
Attorney, Agent, or Firm—Bierman and Muserlian

[57] ABSTRACT

A tensioning device for belts, chains and similar components especially for the camshaft drive of an internal combustion engine comprising a tension roller mounted on a movable support and a control element by which the support can be moved by an actuating mechanism in the relaxing direction of the belt against the action of a pressure spring when the control element gets heated, characterized in that the control element has a cavity for receiving a pressure liquid whose volume varies as a function of the temperature, the cavity being closed by a membrane connected to the actuating mechanism which operates dependably for long periods of time.

10 Claims, 2 Drawing Sheets

BELT TENSIONING DEVICE

STATE OF THE ART

When belt or chain drives are used in engines subjected to fluctuations of temperature e.g. in internal combustion engines, the thermal stresses lead to an increase in the distance between the axles of the driving and the driven belt pulleys which can result in undesirably high belt tensions. Tensioning devices are employed to compensate such tension increases. DE-OS 25 35 676 describes a tensioning device whose temperature-dependent control element acts upon a two-armed swivelling lever which is connected to the support of a tension roller by an elastic block acting as a pressure spring. In this case, the control element has the configuration of a thermoelement with a sensor and a motor as the adjusting device which effects an axial displacement of a final adjusting element and through this, the movement of the swivelling lever as a function of the temperature variation.

EP-OS 00 38 233 describes a tensioning device which adjusts the position of a tension roller as a function of the temperature. In this case, the control element in the form of a thermal expansion cylinder acts upon an eccentrically mounted circular support of a tension roller against the action of a helical pressure spring whereby with rising temperature, the tension roller is moved in the relaxing direction. If a pressure-medium cylinder is employed as the control element in which the temperature-dependent expansion of a pressure liquid e.g. an hydraulic oil is used to displace a piston rod which in turn displaces the support of the tension roller, there is the problem of leak-proofing the cavity for the liquid confined by the piston. As a result of the piston movements, there is a constant loss of the pressure liquid at the inner cylinder wall due to leakage even if sliding oil seals are used between the cylinder and piston. For this reason, a control element of this kind loses its serviceability sooner or later.

OBJECTS OF THE INVENTION

It is an object of the invention to provide a tensioning device with a control element which operates dependably and durably.

This and other objects and advantages of the invention will become obvious from the following detailed description.

THE INVENTION

The novel tensioning device of the invention is a tensioning device for belts, chains and similar components especially for the camshaft drive of an internal combustion engine comprising a tension roller mounted on a movable support and a control element by which the support can be moved by an actuating mechanism in the relaxing direction of the belt against the action of a pressure spring when the control element gets heated characterized in that the control element has a cavity for receiving a pressure liquid whose volume varies as a function of the temperature, the cavity being closed by a membrane connected to the actuating mechanism.

The control element is provided with a cavity to receive a pressure liquid which undergoes volume variations as a function of temperature which cavity is closed by a membrane connected to the actuating mechanism. In this way, an elastic deformation of the membrane can take place when a rise of temperature causes an expansion of the pressure liquid, thus increasing the size of the cavity without the formation of sliding sealing surfaces. The membrane thereby transmits the thrust produced by the pressure of the liquid to the actuating mechanism. When the temperature falls, the pressure spring brings the actuating mechanism and the membrane to their original positions corresponding to the decrease in volume of the liquid.

The membrane can be retained by a back-up ring fixed in the control element so that a stressing of the membrane in its peripheral region resulting from fixing measures can be avoided. The control element is preferably in the form of a pressure-medium cylinder in whose bore the back-up ring is axially propped by a snap ring. This results in a simple manner of fixing the back-up ring in the control element whereby the back-up ring only needs to hold on the side facing the outside of the control element because towards the inside, it is supported by the pressure liquid.

The membrane can be made of a material having elastic properties similar to rubber and be provided with a peripheral flange by which it is axially held at an annular supporting surface within the back-up ring. This configuration makes it possible to dimension the back-up ring and the membrane with approximately the same thickness so that the membrane/back-up ring unit forms a discoid component.

The actuating mechanism can be in the form of a pressure piston connected with the membrane at its end which is located in the control element. Such a piston has no points of direct contact with the housing of the control element so that problems resulting from sliding friction and leakage losses of pressure liquid connected with this are eliminated. For the end part of the pressure piston, a receiving sleeve closed by a base on one side, can be fixed within a central bore of the membrane which acts to center the pressure piston. A secure and durable fixing of the receiving sleeve in the membrane is achieved by the fact that the receiving sleeve is vulcanized into the bore of the membrane.

If the pressure spring is located in the cylindrical housing of the control element and is propped against the pressure piston at one end and against the housing at the other end, a compact structural unit is formed for the control element together with the actuating mechanism. The fact that the pressure spring does not have to be fixed anywhere else simplifies the construction of the tensioning device. In this way, a defective control element including pressure spring and pressure piston can be replaced in a simple manner. As the pressure spring, a disk spring surrounding the pressure piston can be used thus enabling a high resilience corresponding to the pressure of the pressure liquid caused by thermal expansion to be obtained within a small design space. However, it is also possible to use a helical spring instead of a disk spring.

REFERRING NOW TO THE DRAWINGS

Figure 1:
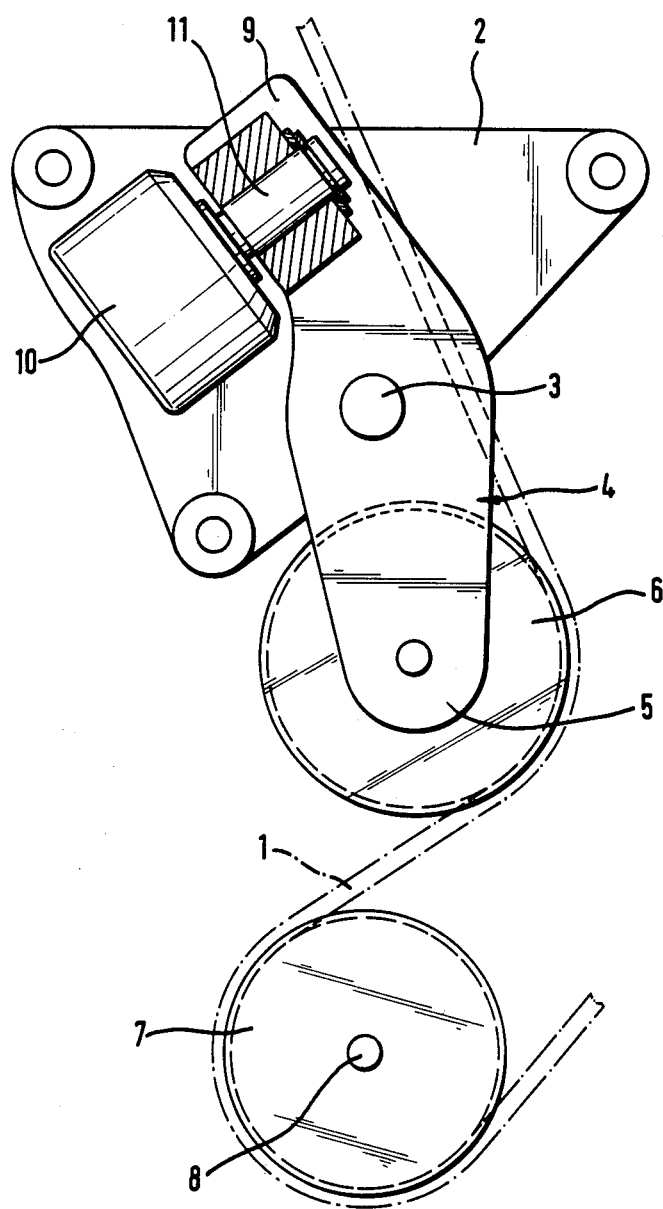
FIG. 1 is a schematic view of a tensioning device with a belt placed around a belt pulley and a tension roller.
Figure 2:
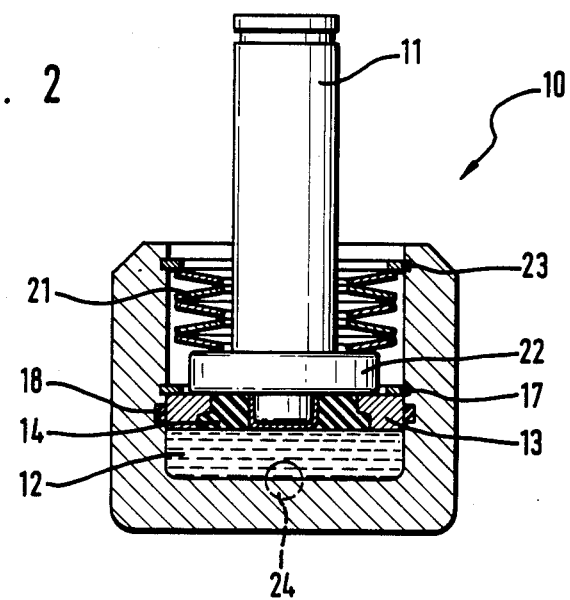
FIG. 2 is a longitudinal section of a control element of the tensioning device with a built-in membrane.
Figure 3:
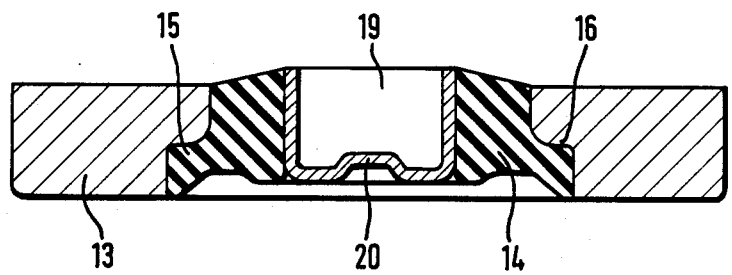
FIG. 3 is a sectional enlargement of FIG. 2 showing the membrane built-in into the control element and held by a back-up ring.

A tensioning device of the invention for the belt 1 of the camshaft drive of an internal combustion engine is provided with a base plate 2 which can be fixed to the engine, on which base plate, a swivelling lever 4 is mounted on a fixed axle 3. A tension roller 6 mounted on the lower arm 5 of the swivelling lever 4 serves to tighten the belt 1 running from a belt pulley 7 of the axle 8 of the crankshaft to the camshaft which is not included in the figure.

A control element 10 fixed to the base plate 2 acts by a pressure piston 11 upon the upper arm 9 of the swivelling lever 4. When the pressure piston 11 is moved out of the housing of the control element 10, a swivelling movement of the lever 4 directed against the tightening action of the tension roller 6 is produced. With increasing distance between the axles of the camshaft and the axle 8 of the crankshaft caused by the warming up of the internal combustion engine during operation, the pretension of the belt 1 increases which increase in the belt tension is compensated for by the outward movement of the pressure piston 11 which causes the tension roller 6 to slew in the relaxing direction.

The control element 10 is designed as an hydraulic cylinder which has a cavity 12 for a pressure liquid. In the bore of the control element 10, there is a back-up ring 13 with a membrane 14 made of a material having elastic properties simlar to rubber and situated in the central opening of the back-up ring 13. The membrane 14 with an integrated flange 15 is axially retained at the annular supporting surface 16 of the back-up ring 13. A snap ring 17 serves to fix the back-up ring 13 in the bore of the control element 10 and prevents an axial displacement of the back-up ring 13 towards the outside of the control element 10. A displacement in the opposite direction is not possible because the back-up ring 13 with the membrane 14 is supported by the pressure liquid in the cavity 12. The back-up ring in the control element 10 is leak-proofed by means of an annular seal 18.

The end of the pressure piston 11 inside the control element 10 is placed in a receiving sleeve 19 whose one end on the side of the pressure liquid is closed with a base 20 and is situated in the central opening of the membrane 14. The receiving sleeve 19 is vulcanized into the opening of the membrane 14 so that a strong and leak-proof joint is obtained. With the help of the receiving sleeve 19, the pressure piston 11 is centered in the control element.

Within the control element 10, the pressure piston is surrounded by a disk spring 21 which at its one end facing the cavity 12 is propped against a collar 22 of the pressure piston 11 and at the other end, a snap ring 23, both being located within the control element 10. This pressure spring therefore tends to push the pressure piston 11 into the housing whereas when the control element 10 gets heated, the expanding pressure liquid moves the pressure piston 11 against the action of the disk spring 21 out of the housing.

To regulate the extent of swivel of the swivelling lever 4 and by this also the tensioning force of the tension roller 6, the amount of the pressure liquid can be varied. For this purpose, the cavity 12 is provided with a filling screw 24. Another method of regulating the swivel is to change the position of the control element 10 on the base plate 2. For this purpose, oblong holes can be provided on the base plate for mounting the control element 10.

Various modifications of the tensioning device may be made without departing from the spirit or scope thereof and it is to be understood that the invention is intended to be limited only as defined in the appended claims.

What we claim is:

1. A tensioning device for belts, chains and similar components especially for the camshaft drive of an internal combustion engine comprising a tension roller mounted on a movable support and a control element by which the support can be moved by an actuating mechanism in the relaxing direction of the belt against the action of a pressure spring when the control element gets heated, characterized in that the control element has a cavity for receiving a pressure liquid whose volume varies as a function of the temperature, the cavity being closed by a membrane connected to the actuating mechanism.

2. A tensioning device of claim 1 wherein the membrane is retained by a back-up ring fixed in the control element.

3. A tensioning device of claim 1 wherein the control element is designed as an hydraulic cylinder in whose bore a back-up ring is axially propped by a snap ring.

4. A tensioning device of claim 1 wherein the membrane is made of a material having elastic properties similar to rubber and is provided with an integrated peripheral flange by which it is axially held within the snap ring at its annular supporting surface.

5. A tensioning device of claim 1 wherein the actuating mechanism is in the form of a pressure piston the one end of which, situated within the control element, is connected to the membrane.

6. A tensioning device of claim 1 wherein a sleeve closed at one end by a base and serving to receive the end part of the pressure piston is fixed inside a central bore of the membrane.

7. A tensioning device of claim 6 wherein the receiving sleeve is vulcanized into the bore of the membrane.

8. A tensioning device of claim 1 wherein the pressure spring is fitted within a cylindrical housing of the control element whereby it is propped against the pressure piston on one side and against the housing on the other side.

9. A tensioning device of claim 8 wherein the pressure spring is a disk spring surrounding the pressure piston.

10. A tensioning device of claim 8 wherein the pressure spring is a helical spring surrounding the pressure piston.

* * * * *